United States Patent
Ajioka

(10) Patent No.: US 10,540,121 B2
(45) Date of Patent: Jan. 21, 2020

(54) NON-TRANSITORY COMPUTER-READABLE RECORDING MEDIUM STORING INPUT ASSISTANCE PROGRAM AND INPUT ASSISTING METHOD

(71) Applicant: KONICA MINOLTA, INC., Chiyoda-ku, Tokyo (JP)

(72) Inventor: Takashi Ajioka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/258,189

(22) Filed: Jan. 25, 2019

(65) Prior Publication Data
US 2019/0243586 A1    Aug. 8, 2019

(30) Foreign Application Priority Data
Feb. 5, 2018 (JP) .................................. 2018-017813

(51) Int. Cl.
*G06F 3/12* (2006.01)
*G06N 20/00* (2019.01)

(52) U.S. Cl.
CPC .......... *G06F 3/1204* (2013.01); *G06F 3/1205* (2013.01); *G06F 3/1258* (2013.01); *G06N 20/00* (2019.01)

(58) Field of Classification Search
None
See application file for complete search history.

(56) References Cited

U.S. PATENT DOCUMENTS

| 2014/0055799 A1* | 2/2014 | Nakagawa ......... G06K 15/1803 358/1.13 |
| 2018/0189004 A1* | 7/2018 | Yokoohji .............. G06F 3/1206 |
| 2019/0007568 A1 | 1/2019 | Nakahara |

FOREIGN PATENT DOCUMENTS

| JP | 2010282416 A | 12/2010 |
| JP | 2014126902 A | 7/2014 |
| JP | 2015176293 A | 10/2015 |
| JP | 2017147668 A | 8/2017 |

* cited by examiner

*Primary Examiner* — Lennin R Rodriguezgonzalez
(74) *Attorney, Agent, or Firm* — Holtz, Holtz & Volek PC

(57) ABSTRACT

Provided are a non-transitory computer-readable recording medium storing an input assistance program and an input assisting method. A hardware processor of an apparatus for configuring setup options for a print job, receives an operator's input of a value for one of setup options for a print job, and searches for a candidate value for an unspecified setup option, for which no value is specified by an operator's input, among the setup options for the print job, by using a rule chosen from a rule collection prepared in advance, on the basis of the value input for the one of the setup options and a value or values each already specified for another of the setup options by an operator's input or by default. In response to finding a candidate value for the unspecified setup option, the hardware processor causes a display of the apparatus to display the candidate value.

12 Claims, 10 Drawing Sheets

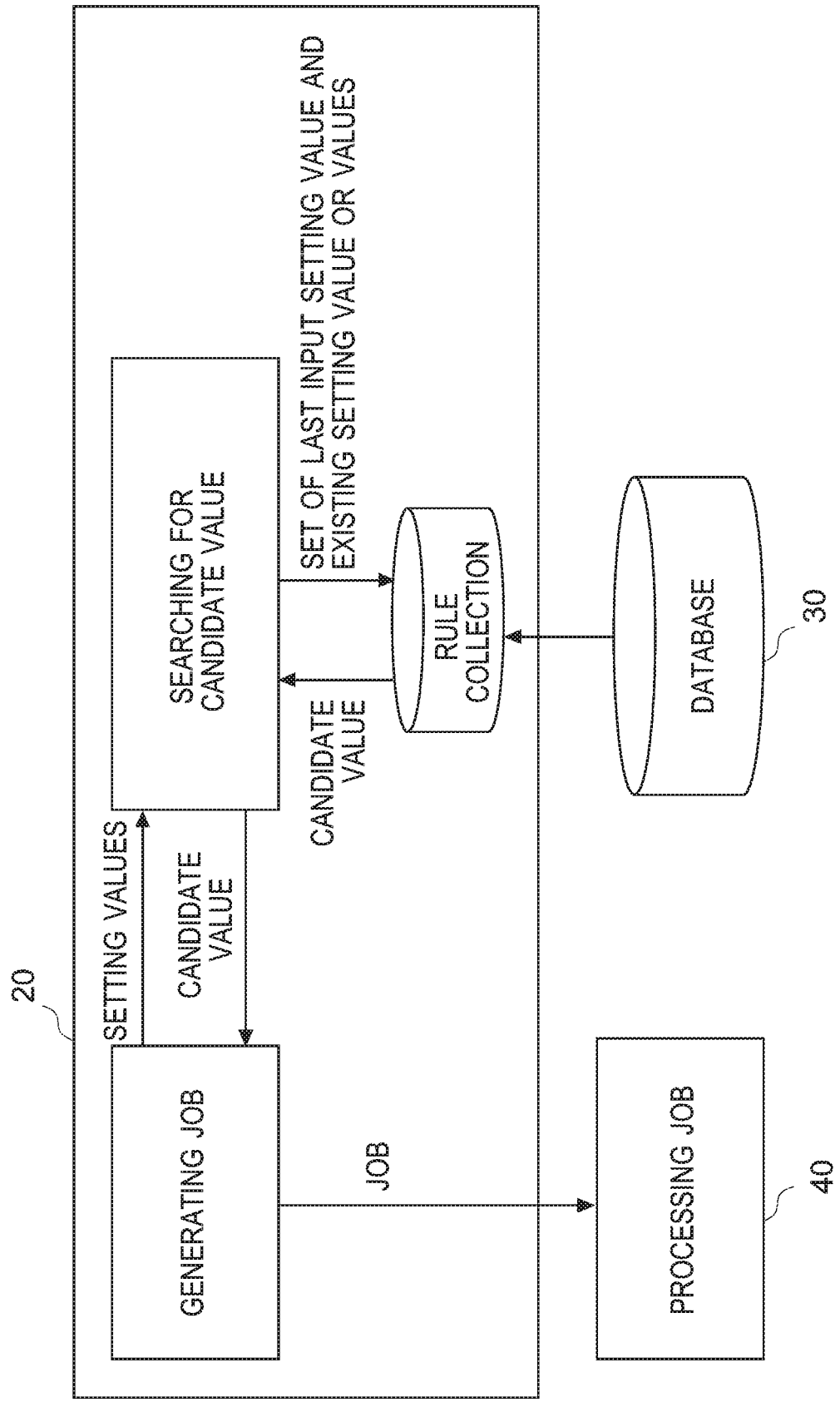

FIG. 6

| Field | Value |
|---|---|
| PRODUCT NAME: | |
| PRODUCT CATEGORY: | |
| CUSTOMER NAME: | |
| CUSTOMER CODE: | |
| SALES STAFF NAME: | |
| SALES STAFF CODE: | |
| CONTACT ADDRESS: | |
| OUTPUT TO: | ◉ MIS ○ AccurioPro |
| PRODUCT SIZE: | A4 ▼ |
| | 182 × 257 |
| TOTAL PAGES: | 182 |
| COPIES: | 10000 ▼ |
| BINDING STYLE: | SADDLE STITCH ▼ |
| BINDING POSITION: | ◉ LEFT ○ RIGHT ○ NONE |
| JOB NAME: | |
| PAPER TYPE: | Fine N ▼ |
| PAPER SIZE: | A4 ▼ |
| | 182 × 257 |
| PRINT METHOD: | DEP ▼ |
| PRINTED SHEETS: | 10000 ▼ |
| COLORS: | 4+4 ▼ |
| PRINT ORDER: | KCMYKCMY ▼ |
| DATE TO PRINT: | |
| DELIVERLY DATE: | 2017/12/31 ▣ |
| PRODUCT STYLE: | |
| DELIVERLY DESTINATION: | |
| COLOR CALIBRATION: | DEP |
| SHEETS FOR CALIBRATION: | 6 |
| COLOR CONFIGURATION: | JapanColor Density |

[ OK ]  [ CANCEL ]

| | |
|---|---|
| JOB NAME: | |
| PRINT METHOD: | ▼ |
| PRODUCT SIZE: | ▼ |
| PAPER SIZE: | ▼ |
| BINDING STYLE: | ▼ |
| DELIVERY DATE: | ▪ |

FIG. 8

| | |
|---|---|
| JOB NAME: | |
| PRINT METHOD: | OFFSET ▼ |
| PRODUCT SIZE: | A4 ▼ |
| PAPER SIZE: | ▼ |
| BINDING STYLE: | SADDLE STITCH ▼ |
| DELIVERY DATE: | 2017/12/31 ▪ |

FIG. 9

|  | SPECIFIED SETUP OPTION | VALUE | UNSPECIFIED SETUP OPTION | CANDIDATE VALUE |
|---|---|---|---|---|
| RULE 1 | PRINT METHOD | OFFSET | PAPER SIZE | A1 |
|  | PRODUCT SIZE | A4 |  |  |
| RULE 2 | PRINT METHOD | OFFSET | PAPER SIZE | A1 |
|  | PRODUCT SIZE | A5 |  |  |
| RULE 3 | PRINT METHOD | DEP | PAPER SIZE | SRA3 |
|  | PRODUCT SIZE | A4 |  |  |
| RULE 4 | PRINT METHOD | DEP | PAPER SIZE | SRA3 |
|  | PRODUCT SIZE | A5 |  |  |

FIG. 10

JOB NAME:
PRINT METHOD: OFFSET
PRODUCT SIZE: A4
PAPER SIZE: A1
BINDING STYLE: SADDLE STITCH
DELIVERY DATE: 2017/12/31

| | |
|---|---|
| JOB NAME: | |
| PRINT METHOD: | DEP ▼ |
| PRODUCT SIZE: | A4 ▼ |
| PAPER SIZE: | ▼ |
| BINDING STYLE: | SADDLE STITCH ▼ |
| DELIVERY DATE: | 2017/12/31 ■ |

| | |
|---|---|
| JOB NAME: | |
| PRINT METHOD: | DEP ▼ |
| PRODUCT SIZE: | A4 ▼ |
| PAPER SIZE: | SRA3 ▼ |
| BINDING STYLE: | SADDLE STITCH ▼ |
| DELIVERY DATE: | 2017/12/31 ■ |

FIG. 14

| INDEFINITE SETUP OPTION | | DEFINITE SETUP OPTION | |
|---|---|---|---|
| PAPER SIZE | A4 | PRINT METHID | DEP |
| | | PRODUCT SIZE | A4 |
| | | BINDING METHOD | SADDLE STITCH |

FIG. 15

JOB NAME: [          ]
PRINT METHOD: [ DEP ▼ ]
PRODUCT SIZE: [ A4 ▼ ]
PAPER SIZE: [ SRA3 (SUPPORT VALUE:0.8) ▼ ]
BINDING STYLE: [ SADDLE STITCH ▼ ]
DELIVERY DATE: [ 2017/12/31 ■ ]

FIG. 16

JOB NAME: [          ]
PRINT METHOD: [ DEP ▼ ]
PRODUCT SIZE: [ A4 ▼ ]
PAPER SIZE: [ SRA3 ▼ ]
BINDING STYLE: [ SADDLE STITCH ▼ ]
DELIVERY DATE: [ 2017/12/31 ■ ]

NON-TRANSITORY COMPUTER-READABLE RECORDING MEDIUM STORING INPUT ASSISTANCE PROGRAM AND INPUT ASSISTING METHOD

Japanese Patent Application No. 2018-017813 filed on Feb. 5, 2018, including description, claims, drawings, and abstract, the entire disclosure of which is incorporated herein by reference in its entirety.

TECHNOLOGICAL FIELD

The present invention is directed to non-transitory computer-readable recording media each storing an input assistance program and input assisting methods. In particular, the present invention is directed to non-transitory computer-readable recording media each storing an input assistance program and input assisting methods, which can assist operator's operations to configure setup options for a print job on a setup screen.

BACKGROUND

For executing print processing, an operator configures various setup options for a print job on a print setup screen displayed by a printing system or a printing device, to generate the print job. Because of a large number of setup options for a print job and complicated setup contents, erroneous input can often occur in the operations to configure a print job. In view of that, in order to make operator's operations to input setup information easier, there have been proposed systems configured to use a database including records of setup information that had been specified for past print jobs and had been registered in advance, and to use the database to present an operator a candidate for a setting value prepared by using machine learning.

For example, Japanese Unexamined Patent Publication (JP-A) No. 2017-147668 discloses the following information processing apparatus. The information processing apparatus includes: a storage storing operating patterns of one or more image forming apparatuses and setup contents for the one or more image forming apparatuses with being associated with each other, and an accumulator for accumulating history data indicating an operating history or histories of the one or more image forming apparatuses. The information processing apparatus further includes an output controller configured to, on finding in the history data accumulated in the accumulator history data corresponding to a certain operating pattern stored in the storage, output setup contents stored in the storage in association with the certain operating pattern to the one or more image forming apparatuses.

For another example, JP-A No. 2015-176293 discloses the following information processing apparatus. The information processing apparatus includes a display configured to display print settings recommended on the basis of print data; and one or more processors. The one or more processors are configured to receive a change of a value for a first print setup option among the print settings, and in response to receiving the change, use a history of print settings used for past print processing, to determine a second print setup option to be changed together with the change of the value for the first print setup option. The display is further configured to display a recommendation to change a value for the determined second print setup option.

For another example, though it is not a technique relating to print processing, JP-A No. 2010-282416 discloses the following method for recommending section data to an operator. In the method, an apparatus uses a first text file of a parent population of text information and a second text file of samples of text information to which verified section data have been added, to generate a first data file of a classification code table and a second data file of a table of statistical information of classification codes, where the first data file indicates correspondence between section data and classification codes, and the table of statistical information of classification codes is a collection of occurrence numbers of classification codes in the first text file. The apparatus extracts classification codes from new text information, and then extracts pieces of section data corresponding to the classification codes, from the first data file. The apparatus further extracts statistical information from the second data file, for each piece of section data, and then selects and presents candidates for the pieces of section data corresponding to the new text information, on the basis of the extracted statistical information.

As an example of a technique to judge whether input information is appropriate, JP-A No. 2014-126902 discloses the following product information management apparatus configured to manage information of products and components. The product information management apparatus includes a storage controller that stores and registers various kinds of product information including data about components of products and requirements for the products, and co-occurrence relationship between the various kinds of product information, into a storage. The product information management apparatus further includes: one or more processors configured to use component data and product requirement data of the various kind of product information, to calculate information of conditions for determining the appropriateness of components, and store the calculated information in the storage. The product information management apparatus further includes: a display configured to present on a screen the co-occurrence relationship to an operator.

There are a large number of setup options to be configured for a print job, and it increases operator's time and efforts necessary for input operations and creates operator's demands to complete configuration of a print job with a reduced number of input operations. JP-A No. 2017-147668 discloses a technique to search for a template for similar settings, on the basis of history data such as job names and original documents, but the disclosed template is not suitable to be used for a situation that a part of setup options has been changed and another situation that setup options are configured for generating a new print job, because the template is prepared by fixing the setup contents at the same time. Further, JP-A No. 2015-176293 discloses a technique to present a setup option to be changed together with a change of a part of settings specified for a job, and a candidate value for the setup option to be changed, but the disclosed technique is not suitable for presenting a candidate value for a setup option for which no value is input.

Further, there are complicated constraints on a combination of settings for a print job, and learning of possible combinations of setting values for all the setup options increases the cost of machine learning. Accordingly, a selection of setup options to be used for the machine learning and a selection of a setup option for which a candidate value is to be presented are important for the design for a system for presenting a candidate value for a setup option.

Further, operators performing input operations can improve their skills to configure a print job, by checking a candidate for a value to be specified for a setup option, presented by the system, but such a system does not always find and present an appropriate candidate. As a reason why the system fails to determine an appropriate candidate value for a certain setup option, it can be considered that, in spite of appropriate setting values that have already been input for other setup options, there are no candidate value or multiple candidate values for the certain setup option that can be used together with the setting values input for other setup options. As another reason, it can be considered that one of the other setup options for which setting values have been input is indefinite and it makes a judgement of the appropriateness of a candidate value found for the certain setup option by the system difficult. When the system does not present a candidate, operators cannot know a reason why the system does not present a candidate, and operators' configuration skills are not improved in the situation.

SUMMARY

The present invention is directed to non-transitory computer-readable recording media each storing an input assistance program and input assisting methods, which can decrease operator's time and efforts necessary for input operations.

The present invention is further directed to non-transitory computer-readable recording media each storing an input assistance program and input assisting methods, which can improve operator's configuration skills.

A non-transitory computer-readable recording medium reflecting one aspect of the present invention stores an input assistance program to be executed in an apparatus for configuring setup options for a print job. The program comprises instructions which, when executed by a hardware processor of the apparatus, cause the hardware processor to perform the following operations. The operations comprise receiving an operator's input of a value for one of setup options for a print job through an input device of the apparatus. The operations further comprise searching for a candidate value for an unspecified setup option, for which no value is specified by an operator's input, among the setup options for the print job, by using a rule chosen from a rule collection prepared in advance, on the basis of the value input for the one of the setup options and a value or values each already specified for another of the setup options by an operator's input or by default. The operations further comprise, in response to finding the candidate value, causing a display of the apparatus to display the candidate value for the unspecified setup option.

A method reflecting one aspect of the present invention is an input assisting method for use in an apparatus for configuring setup options for a print job. The method comprises receiving, by a hardware processor of the apparatus, an operator's input of a value for one of setup options for a print job through an input device of the apparatus. The method further comprises searching, by the hardware processor, for a candidate value for an unspecified setup option, for which no value is specified by an operator's input, among the setup options for the print job, by using a rule chosen from a rule collection prepared in advance, on the basis of the value input for the one of the setup options and a value or values each already specified for another of the setup options by an operator's input or by default. The method further comprises, in response to finding the candidate value, causing, by the hardware processor, a display of the apparatus to display the candidate value for the unspecified setup option.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 2 is a schematic diagram illustrating outline operations of the setup-information input system according to one embodiment of the present invention;

FIG. 6 is a diagram illustrating an example of a print setup screen displayed by the information input apparatus according to one embodiment of the present invention;

FIG. 7 is a diagram illustrating a part of setup options shown in the print setup screen displayed by the information input apparatus according to one embodiment of the present invention;

FIG. 8 is a diagram illustrating a part of setup options shown in the print setup screen (in the condition that values have been specified for several setup options) displayed by the information input apparatus according to one embodiment of the present invention;

FIG. 9 is a diagram illustrating an example of associations between specified setup options and their values, and an unspecified setup option and a candidate value for the unspecified setup option, shown in the print setup screen displayed by the information input apparatus according to one embodiment of the present invention;

FIG. 10 is a diagram illustrating a part of setup options shown in the print setup screen (in the condition that a candidate value for a certain setup option appears in the input field) displayed by the information input apparatus according to one embodiment of the present invention;

FIG. 14 is a diagram illustrating an example of a record registered in a database stored in a storage device according to one embodiment of the present invention;

FIG. 15 is a diagram illustrating a part of setup options shown in the print setup screen (in another condition that a candidate value for a certain setup option appears in the input field) displayed by the information input apparatus according to one embodiment of the present invention; and FIG. 16 is a diagram illustrating a part of setup options shown in the print setup screen (in another condition that a candidate value for a certain setup option appears in the input field) displayed by the information input apparatus according to one embodiment of the present invention.

DETAILED DESCRIPTION OF EMBODIMENTS

Figure 1:
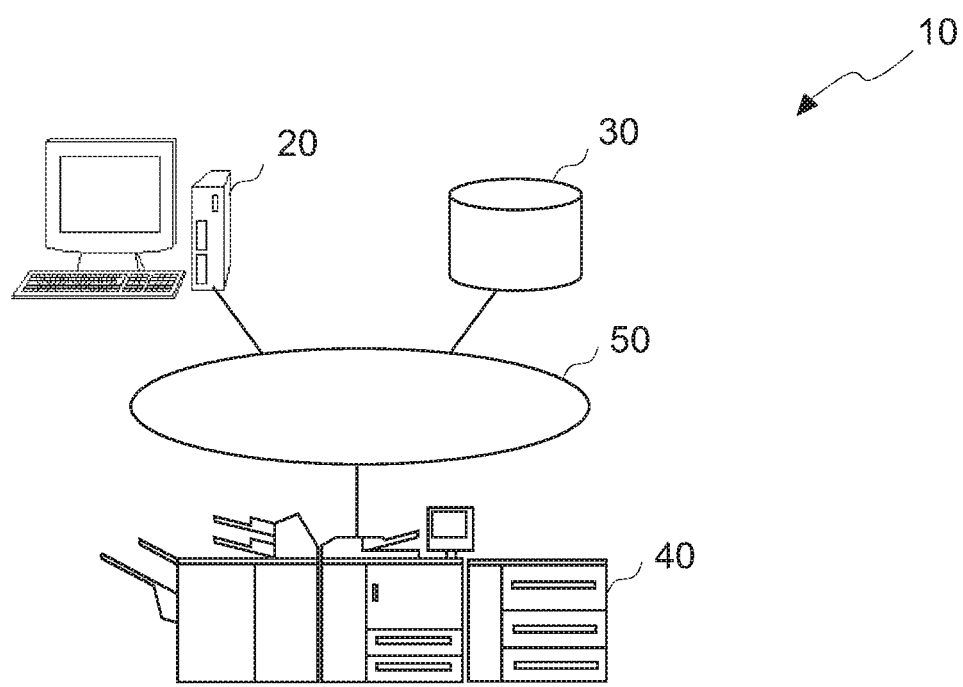
FIG. 1 is a schematic diagram illustrating an example of the constitution of a setup-information input system according to one embodiment of the present invention.

Hereinafter, one or more embodiments of the present invention will be described with reference to the drawings. However, the scope of the invention is not limited to the illustrated embodiments.

As noted in the BACKGROUND, there have been proposed systems configured to use a database including records of setup information that had been specified for past print jobs and had been registered in advance, and to present a candidate for a setting value prepared by machine learning using the database. A use of these systems decreases operator's time and efforts necessary for input operations to be performed for configuration of a print job.

However, there are complicated constraints on a combination of settings for a print job, and learning of possible combinations of setting values for all the setup options increases the cost of machine learning. Further, the proposed systems do not always find and present an appropriate candidate. When the systems do not present a candidate, operators cannot know a reason why the systems do not present a candidate, and operators' configuration skills are not improved in the situation.

In view of that, the following technique to control an apparatus (an information input apparatus) for configuring setup options for a print job, is provided as an embodiment of the present invention. That is, a hardware processor of the apparatus receives an operator's input of a value for one of setup options (a target setup option) for a print job through an input device of the apparatus, and searches for a candidate value for an unspecified setup option, for which no value is specified by an operator's input, among the setup options for the print job by using a rule chosen from a rule collection prepared in advance, on the basis of the value input for the target setup option and a value or values each already specified for another of the setup options by an operator's input or by default. The rule collection may be created by the hardware processor, by using machine learning on the basis of a database including records of values which had been specified for setup options for past print jobs, where the database is stored in a storage device which is communicatively connected to the hardware processor of the apparatus. For example, the hardware processor may use machine learning to extract from the database combinations of setting values specified for past print jobs, and then use the extracted combinations to create rules, where the rules provide a candidate value for an unspecified setup option, which is a value for a certain setup option that is likely to be specified (for example, is frequently used to be specified in the database) together with values each already specified for another setup options by an operator's input or by default. In response to finding a candidate value for the unspecified setup option, the hardware processor causes a display of the apparatus to display the candidate value for the unspecified setup option. In this process, the hardware processor may use an evaluation value (for example, support, confidence or lift used in association analysis) calculated for each rule of the rule collection, to cause the display of the apparatus to display the evaluation value calculated for the rule used in the process of searching for the candidate value, together with the candidate value, or change the appearance of the candidate value displayed on the display, according to the evaluation value calculated for the rule used in the process of searching for the candidate value. For example, a candidate value given by a rule having a large evaluation value may be shown in boldface or by colored text.

According to the above-described operations, in response to an operator's input of a value for a part of setup options for a print job on a print setup screen, a value proposed for another setup option (for which no value is not specified by an operator's input) automatically appears in the print setup screen. By using the apparatus executing these operations, an operator does not have to input setting values for all the setup options for a print job and can specify appropriate values for the setup options even if the operator does not have sufficient knowledge about configuration of setup options for a print job. It reduces operator's time and efforts necessary for input operations. Further, by showing an evaluation value together with a candidate value or changing the appearance of a candidate value according to an evaluation value, the apparatus can present the degree of reliability of the candidate value to an operator. Thereby, the apparatus can prompt an operator to input values for other setup options on the print setup screen and reduce human errors in the input operations, originated from operator's failure to check for values specified for the setup options.

Further, as needed, the apparatus may use the database or the rule collection to judge whether the target setup option is a specific type of setup option, where the specific type of setup option is a setup option for which different values are specified together with the same set of values for two or more of the other setup options. In response to failing to find a candidate value for the unspecified setup option (for example, finding no candidate value for the unspecified setup option) and judging that the target setup option is the specific type of setup option, the apparatus may cause the display of the apparatus to output information that gives caution about the target setup option (for example, display a screen that gives caution about the target setup option).

By employing the operations, when finding a candidate value for a certain setup option, the apparatus presents the candidate value for the certain setup option to an operator; and when failing to find a candidate value for a certain setup option and judging that the target setup option is the specific type of setup option, the apparatus calls operator's attention about the setup option. It assists an operator to learn an appropriate combination of setting values and improves operator's configuration skills.

Embodiment

Figure 3A:
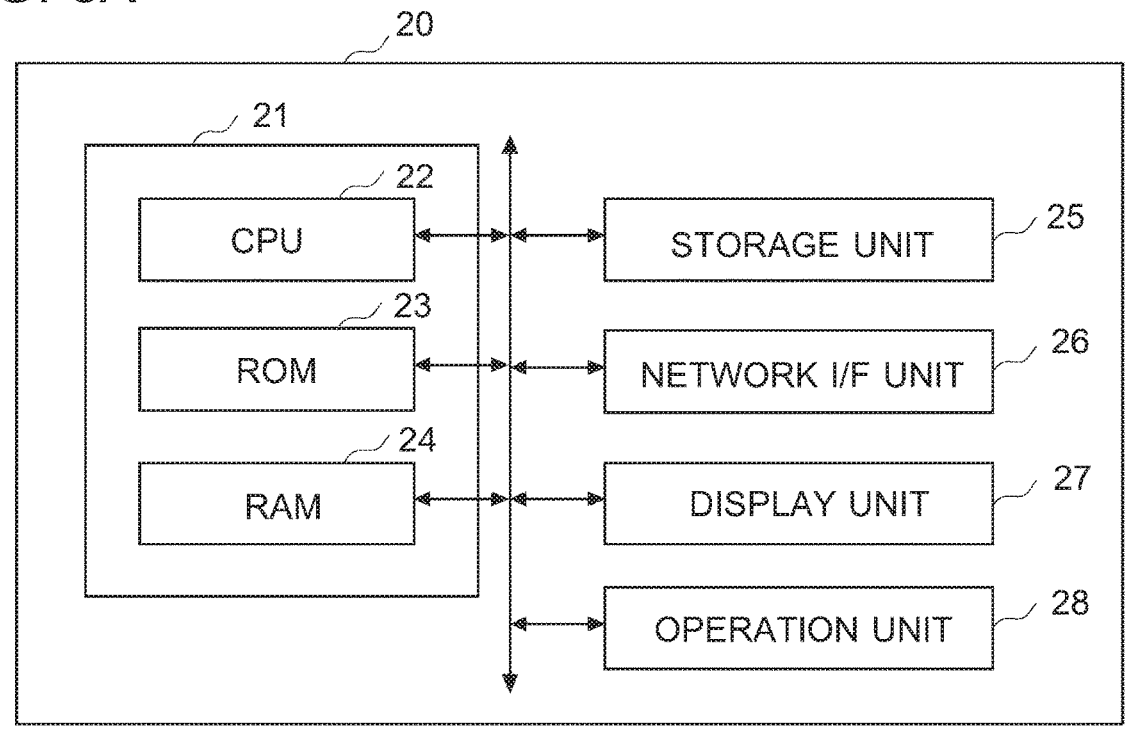
FIGS. 3A and 3B are block diagrams illustrating an example of the constitution of an information input apparatus according to one embodiment of the present invention.
Figure 3B:
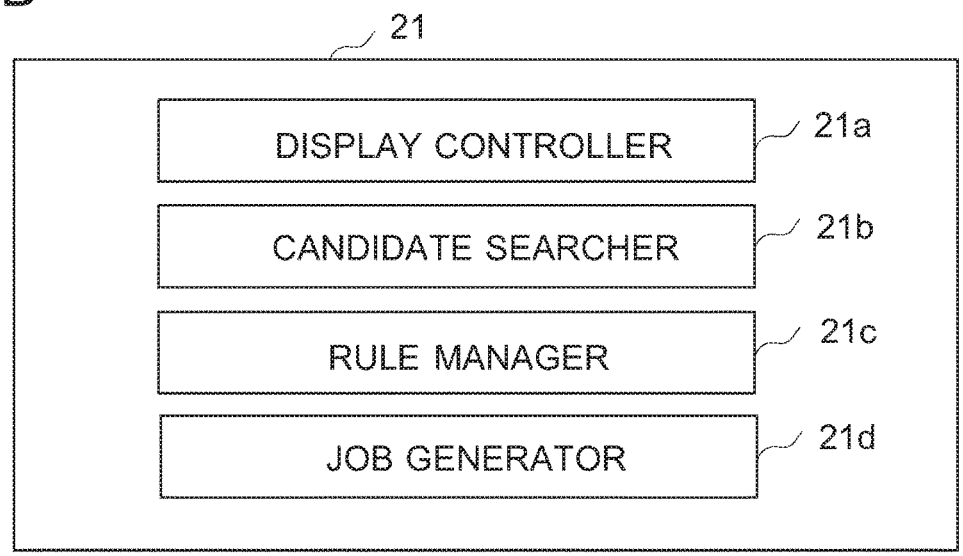
Figure 4:
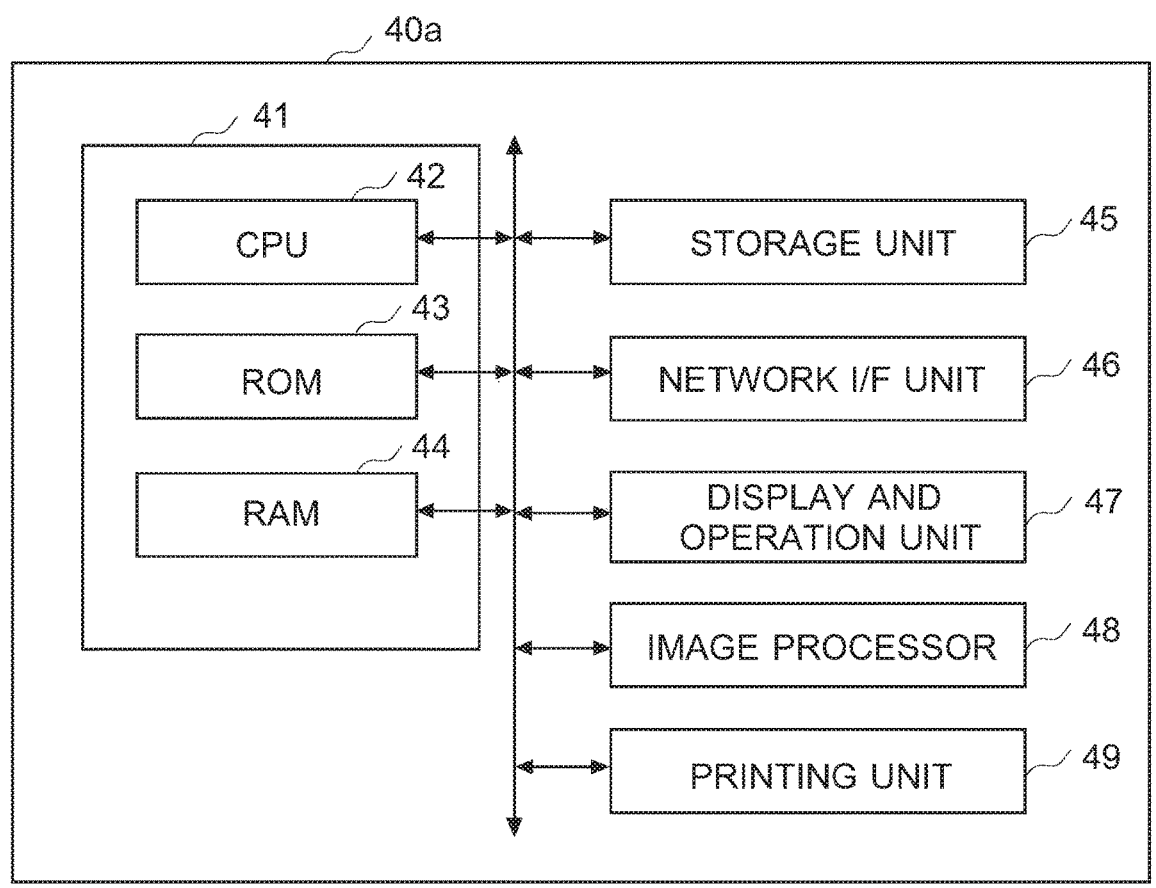
FIG. 4 is a schematic diagram illustrating an example of the constitution of an image forming apparatus according to one embodiment of the present invention.
Figure 5:
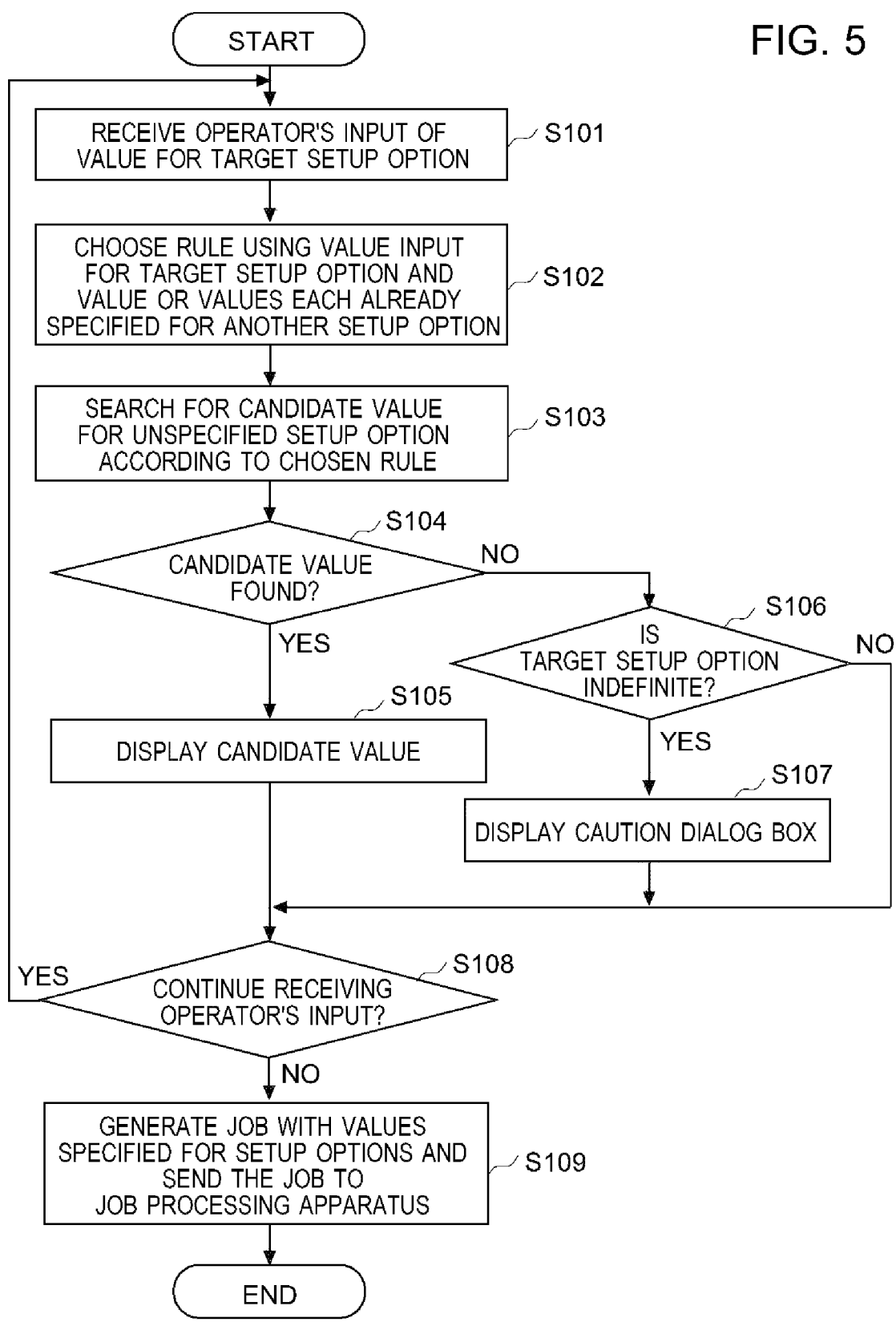
FIG. 5 is a flowchart illustrating an example of operations of the information input apparatus according to one embodiment of the present invention.
Figures 11, 12, 13:
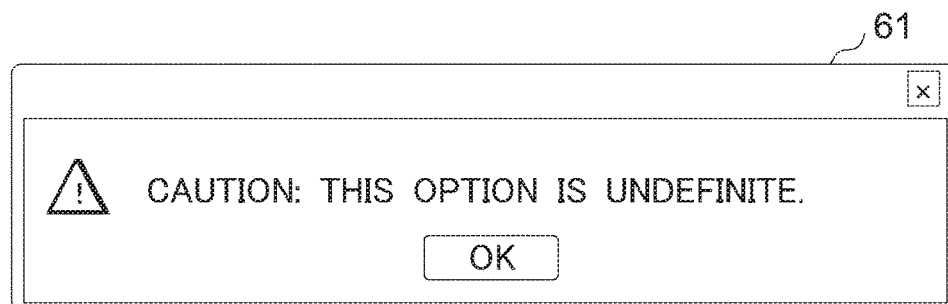
FIG. 11 is a diagram illustrating a part of setup options shown in the print setup screen (in another condition that values have been specified for several setup options) displayed by the information input apparatus according to one embodiment of the present invention.
FIG. 12 is a diagram illustrating a part of setup options shown in the print setup screen (in another condition that a candidate value for a certain setup option appears in the input field) displayed by the information input apparatus according to one embodiment of the present invention.
FIG. 13 is a schematic diagram illustrating an example of a caution dialog box displayed by the information input apparatus according to one embodiment of the present invention.

In order to describe an embodiment of the present invention in more in detail, a description is given of a non-transitory computer-readable recording medium storing an input assistance program and an input assisting method, with reference to FIG. 1 through FIG. 16. FIG. 1 is a schematic diagram illustrating an example of the constitution of a setup-information input system according to the present embodiment. FIG. 2 is a schematic diagram illustrating outline operations of the setup-information input system. FIGS. 3A and 3B are block diagrams illustrating an example of the constitution of an information input apparatus. FIG. 4 is a schematic diagram illustrating an example of the constitution of an image forming apparatus. FIG. 5 is a flowchart illustrating an example of operations of the information input apparatus. FIG. 6 is a diagram illustrating an example of a print setup screen displayed by the information input apparatus. Each of FIGS. 7, 8, 10 to 12, 15 and 16 is a diagram illustrating an example of a part of setup options shown in the print setup screen. FIG. 9 is a diagram illustrating an example of associations between specified setup options and their values, and an unspecified setup option and a candidate value for the unspecified setup option, to be shown in the print setup screen displayed by the information input apparatus. FIG. 13 is a schematic diagram illustrating an example of a caution dialog box. FIG. 14 is a diagram illustrating an example of a record registered in a database stored in a storage device according to the present embodiment.

FIG. 1 is a schematic diagram illustrating an example of the constitution of setup-information input system 10 according to the present embodiment. As illustrated in FIG. 1, setup-information input system 10 includes information input apparatus 20, storage device 30, and job processing apparatus 40 (image forming apparatus 40a is employed as the job processing apparatus 40 in the present embodiment). These devices are communicatively connected to each other via communication network 50, where examples of the communication network 50 include a LAN (Local Area Network) and WAN (Wide Area Network) defined by specifications, such as Ethernet, Token Ring and FDDI (Fiber-Distributed Data Interface).

FIG. 2 illustrates outline operations of setup-information input system 10 according to the present embodiment. Information input apparatus 20 and job processing apparatus 40 perform the following operations. Storage unit 30 is communicatively connected to the hardware processor of the information input apparatus 20 and stores a database that includes records of values which had been specified for setup options for past jobs. On the basis of the database, a collection of rules (a rule correction) is prepared in advance, where the rules use values specified for two or more setup options for a job, passed as arguments, and return a candidate value for another setup option, which is likely to be specified together with the values passed as arguments. When an operator inputs information for setup options (values for setup options for a job) in a setup screen displayed on the display of information input apparatus 20, to generate a job, a hardware processor of the information input apparatus 20 assists operator's input operations by obtaining a candidate value for an unspecified setup option, for which no value is specified by an operator's input, among the setup options for the job, by using the rule collection, and displaying the candidate value in the setup screen. In concrete terms, in response to receiving an operator's input of a value for one of setup options (a target setup option) for a job, the hardware processor of the information input apparatus 20 uses the value specified by the operator's input for the target setup option in the screen (the last input setting value) and a value or values each of which had already been specified by an operator's input or by default for another setup option for the job in the screen (the existing setting value or values), chooses from the rule collection a rule with respect to a set of these values, and searches for a candidate value for the unspecified setup option by using the chosen rule. The hardware processor of the information input apparatus 20 then displays the candidate value for the unspecified setup option in the print setup screen. When operator's input operations have ended, information input apparatus 20 then sends the job generated with the values for the setup options for the job to job processing apparatus 40 (for example, image forming apparatus 40a), and causes the job processing apparatus 40 to perform job processing (in a case that image forming apparatus 40a is employed as the job processing apparatus 40, causes the image forming apparatus 40a to perform print processing). Hereinafter, a description of each apparatus is given on the assumption of the constitution illustrated in FIG. 1 in which image forming apparatus 40a is employed as an example of the job processing apparatus 40.

Information Input Apparatus:

Information input apparatus 20 is a computing device like a personal computer and is configured to generate a job and send the job to job processing apparatus 40 (in this embodiment, image forming apparatus 40a). Information input apparatus 20 includes, as illustrated in FIG. 3A, built-in controller 21, storage unit 25, network interface (I/F) unit 26, display unit 27 and operation unit 28.

Built-in controller 21 includes CPU (Central Processing Unit) 22 as a hardware processor, and memories including ROM (Read Only Memory) 23 and RAM (Random Access Memory) 24. CPU 22 reads out control programs stored in ROM 23 or storage unit 25, loads the control programs onto RAM 24, and executes the control programs, thereby controlling operations of the components of information input apparatus 20.

As illustrated in FIG. 3B, built-in controller 21 (CPU 22) is configured to work as display controller 21a, candidate searcher 21b, rule manager 21c and job generator 21d.

Display controller 21a is configured to perform the following operations. Display controller 21a causes display unit 27 to display a print setup screen to be used for generating a job, and receives an operator's input of a value, given through operation unit 28, for each of setup options for the job in the print setup screen. In response to receiving an operator's input of a value for one of the setup options (a target setup option), display controller 21a sends values specified for two or more of the setup options to candidate searcher 21b, where the values include the received value input for the target setup option and a value or values each already specified for another of the setup options by an operator's input or by default. In response to receiving a candidate value for an unspecified setup option from candidate searcher 21b, display controller 21a causes display unit 27 to display the candidate value for the unspecified setup option in the print setup screen so as to fill an input field for the unspecified setup option in the print setup screen with the candidate value. In this process, display controller 21a may cause display unit 27 to display an evaluation value calculated for the rule that was used in the process of searching for the candidate value, together with the candidate value in the print setup screen, or may change the appearance of the candidate value displayed in the print setup screen, according to the evaluation value. For example, display controller 21a may display the candidate value given from a rule with a high evaluation value, with being emphasized in the print setup screen, by indicating the candidate value in boldface, indicating the candidate value by colored text, or coloring the inside of the frame of the input field where the candidate value appears in the print setup screen with color. Further, display controller 21a may cause display unit 27 to display a screen that gives caution about the target setup option to an operator, according to instructions given from candidate searcher 21b.

Candidate searcher 21b is configured to perform the following operations. In response to receiving the values including the value input for the target setup option and the value or values each already specified for another of the setup options by an operator's input or by default (the value or values each already specified for a specified setup option), candidate searcher 21*b* chooses from the rule collection stored in storage unit 25 or another storage device a rule with respect to the received values, and uses the chosen rule to search for a candidate value for an unspecified setup option, for which no value is specified by an operator's input, among the setup options for the job. When finding a candidate value for the unspecified setup option, option obtainer 21*b* sends the candidate value to display controller 21*a*. When failing to determining a candidate value (for example, finding no candidate value), candidate searcher 21*b* judges whether the target setup option is an indefinite setup option (referred to as a specific type of setup option) for which a unique setting value cannot be determined together with a set of values for two or more of the other setup options. In response to failing to determining a candidate value for the unspecified setup option and judging that the target setup options is the specific type of setup option, candidate searcher 21*b* gives instructions to display a screen that gives caution about the target setup option to display controller 21*a*. In this process, the judgement whether the target setup option is the specific type of setup option can be made by a judgement whether there are multiple values specified for the target setup option together with the same combination of values for two or more of the other setup options. For example, when using a database including records in which the specific type of setup option, for which different values are specified together with the same set of values for two or more of the other setup options, is marked off from the other setup options (for example, the database disclosed in the patent application No. 2018-017029 invented by the present inventor and filed to the Japan Patent Office), candidate searcher 21*b* can check the database to judge whether the target setup option is the specific type of setup option. For another example, candidate searcher 21*b* can check the rule collection stored in storage unit 25 or another storage device to judge whether the target setup option is the specific type of setup option, for which different values are specified together with the same set of values for two or more of the other setup options in the rule collection.

Rule manager 21*c* is configured to use the database stored in storage device 30 to generate rules by using machine learning, and manage a rule collection. That is, by using machine learning, rule manager 21*c* extracts from the database sets of values specified for two or more setup options, and generates rules each of which receives the value input for the target setup option and the value or values that had already been specified for one or more setup options by an operator's input or by default, and returns a candidate for a value that is likely to be specified together with the received values (a rule indicating that if a set of the received values is specified then a certain value that is likely to be specified for an unspecified setup option together with the set of the values is given). Rule manager 21*c* then manages the generated rules as a rule collection. Rule manager 21*c*, as needed, calculates an evaluation value of each of the rules by using association analysis, and manages the evaluation values with being associated with the corresponding rules. As examples of the evaluation value, at least one of the support, confidence or lift used as metrics of the association analysis can be used. For example, the support and confidence and lift of each rule are given by the following mathematical expressions, where the antecedent part of the rule indicates an event that values are specified for two or more setup options in the print setup screen (the IF part in the rule), and the consequent part of the rule indicates an event that a candidate value for an unspecified setup option (which is a value that is likely to be specified for an unspecified setup option together with the values in the antecedent part) is given (the THEN part of the rule):

Support=(the number of records in the database, including all the values in the antecedent and consequent parts of the rule)/(the total number of records in the database);

Confidence=(the number of records in the database, including all the values in the antecedent and consequent parts of the rule)/(the number of records in the database, including all the values in the antecedent part of the rule); and Lift=Confidence/(the number of records in the database, including all the values in the consequent part of the rule).

Job generator 21*d* is configured to generate a job for instructing to perform job processing to job processing apparatus 40 (instructing to perform print processing to image forming apparatus 40*a*), using the values specified for the setup options for the job.

Herein, the above-mentioned display controller 21*a*, candidate searcher 21*b*, rule manager 21*c* and job generator 21*d* may be constituted as hardware devices. Alternatively, the above-mentioned display controller 21*a*, candidate searcher 21*b*, rule manager 21*c* and job generator 21*d* (in particular, display controller 21*a*, candidate searcher 21*b* and rule manager 21*c*) may be provided by an input assistance program which causes built-in controller 21 to function as these sections when being executed by CPU 22. That is, built-in controller 21 may be configured to serve as the display controller 21*a*, candidate searcher 21*b*, rule manager 21*c* and job generator 21*d* (in particular, display controller 21*a*, candidate searcher 21*b* and rule manager 21*c*), when CPU 22 executes the input assistance program.

The input assistance program may be embedded in a printer driver or a direct-print utility program. In an example of generation of a PDL (Page Description Language) job written in page description languages, such as PJL (Printer Job Language), PS (PostScript) and PCL (Printer Control Language), when executing the input assistance program embedded in a printer driver, built-in controller 21 (display controller 21*a*) causes display unit 27 of information input apparatus 20 to display a candidate value for an unspecified setup option in a print setup screen being a graphical user interface given by the printer driver. In another example of generation of a job which enables direct printing, such as PDF (Portable Document Format), XPS (XML Paper Specification), OOXML (Office Open XML) and ODF (OpenDocument Format) jobs, when executing the input assistance program embedded in a direct-print utility program, built-in controller 21 (display controller 21*a*) causes display unit 27 of information input apparatus 20 to display a candidate value for an unspecified setup option in a print setup screen being a graphical user interface given by the direct-print utility program.

Storage unit 25 is a non-transitory computer-readable recording medium including a HDD (Hard Disk Drive) and/or a SSD (Solid State Drive), which stores programs which when being executed causes CPU 22 to control the components of information input apparatus 20, information about processing and functions of information input apparatus 20, data of screens including a print setup screen and a caution screen, a rule collection created by rule manager 21*c*, a job to be sent to job processing apparatus 40 (image forming apparatus 40*a*), and other data.

Network I/F unit 26 includes a NIC (Network Interface Card) and/or a modem. Network I/F unit 26 communicatively connects information input apparatus 20 to communication network 50 so as to access the database stored in storage device 30 and send a job to job processing apparatus 40 (image forming apparatus 40a).

Display unit 27 includes a display like a LCD (liquid crystal display) or an OEL (organic electroluminescence) display, so as to display a print setup screen and a caution screen according to instructions given by display controller 21a.

Operation unit 28 includes input devices, such as a mouse and a keyboard, which allows an operator to perform input operations and selecting operations for setup options shown in the print setup screen.

Storage Device:

Storage device 30 is a device for storing various kinds of information used by information input apparatus 20 in a form of database. In the present embodiment, storage device 30 stores a database of setup information specified for jobs that had been printed in the past (a database of records of values which had been specified for setup options for past print jobs), and serves information input apparatus 20 with the database so that information input apparatus 20 can create a rule collection.

Image Forming Apparatus:

Image forming apparatus 40a is an apparatus configured to perform image forming processing according to a job received from information input apparatus 20, where examples of image forming apparatus 40a include a MFP (multi-functional peripheral). Image forming apparatus 40a includes, as illustrated in FIG. 4, built-in controller 41, storage unit 45, network interface (I/F) unit 46, display and operation unit 47, image processor 48 and printing unit 49.

Built-in controller 41 includes CPU 42 as a hardware processor, and memories including ROM 43 and RAM 44. CPU 42 reads out control programs stored in ROM 43 or storage unit 45, loads the control programs onto RAM 44, and executes the control programs, thereby controlling operations of the components of image forming apparatus 40a.

Storage unit 45 is a non-transitory computer-readable recording medium including a HDD and/or a SSD. Storage unit 45 stores programs which, when being executed, cause CPU 42 to control the components of image forming apparatus 40a; information about processing and functions of image forming apparatus 40a; a job received from information input apparatus 20; image data created by image processor 48; and other data.

Network I/F unit 46 includes a NIC and/or a modem. Network I/F unit 46 communicatively connects image forming apparatus 40a to communication network 50 so that image forming apparatus 40a can receive a job from information input apparatus 20.

Display and operation unit 47 is configured to display various screens relating to printing and allow an operator to perform, on the screens, various kinds of operations relating to printing. Examples of the display and operation unit 47 include a touch screen in which a pressure-sensitive operation unit (a touch sensor) composed of lattice-shaped transparent electrodes is arranged on a display unit.

Image processor 48 serves as a RIP (raster image processor) and is configured to parse a job to create intermediate data and then perform rendering on the intermediate data to create raster data, where the series of these processes is referred to as "rasterization". Image processor 48 is further configured to perform image processing, such as screening, tone correction, density-balance adjustment, thinning, halftoning and other processing, on image data as needed, and output the resulting image data to printing unit 49.

Printing unit (print engine) 49 is configured to perform print processing on the basis of image data. In concrete terms, printing unit 49 includes an exposure unit, an image forming unit, an intermediate transfer belt, a second transfer roller, a fixing unit, and a conveyance unit. The exposure unit is configured to irradiate a photoreceptor drum with a laser beam according to image data so as to perform an exposure process. The image forming unit includes the photoreceptor drum, a developing section, a charging section, a photoreceptor cleaning section, and a first transfer roller, and is configured to form on the photoreceptor drum a toner image in each of CMYK colors. The intermediate transfer belt is driven by rollers so as to work as an intermediate transfer body which conveys the toner images formed by the image forming unit onto a print medium. The second transfer roller is configured to transfer the toner images on the intermediate transfer belt onto a print medium. The fixing unit is configured to fix the images transferred on the print medium. The conveyance unit includes components for conveying print media, for example, a feed roller, a registration roller, a loop roller, a reverse roller, and an output roller.

It should be noted that FIG. 1 to FIG. 4 illustrate an example of setup-information input system 10 according to the present embodiment for illustrative purpose only, and the constitution and operations of each apparatus in the system may be modified appropriately, as far as the control operations of information input apparatus 20, which assist operator's input operations, given in the present embodiment can be achieved. For example, though setup-information input system 10 illustrated in FIG. 1 includes information input apparatus 20 and storage device 30 being separated bodies, the storage device 30 may be omitted, if information input apparatus 20 includes storage device 30 in its body (in other words, if storage unit 25 of information input apparatus 20 stores the above-described database). For another example, if the system includes a storage device for storing jobs generated by information input apparatus 20, job processing apparatus 40 (image forming apparatus 40a) may be omitted or the system may further include a controller for controlling the jobs.

Operations of Information Input Apparatus:

Hereinafter, a description is given of concrete operations of information input apparatus 20 according to the present embodiment CPU 22 of information input apparatus 20 reads out an input assistance program stored in ROM 23 or storage unit 25, loads the program onto RAM 24, and executes the program, thereby executing the steps of the flowchart illustrated in FIG. 5. It is assumed that storage device 30 stores a database including setup information that had been specified for jobs printed in the past (records of values which had been specified for setup options for past print jobs), prepared in advance to the steps, and then built-in controller 21 (rule manager 21c) of information input apparatus 20 has created a rule collection by using machine learning on the basis of the database.

The database stored in storage device 30 may be a database including records in which setup options for each job are registered with being classified into definite setup options and indefinite setup options, as disclosed in the above-described Japan Patent Application No. 2018-1017029 invented by the present inventor and filed with the Japan Patent Office. For example, in the situation that an apparatus configured to revise setup options for a job, like information input apparatus 20, reads from the database setup information for a job registered in advance, and displays values specified for setup options for the job so as to allow an operator to revise the values, an operator's action to revise a value for one of the setup options indicates that a combination of a part of the values specified before the revision includes some kind of problem. In view of that, the apparatus is configured to manage the database by performing the following operations. In response to receiving the operator's operations to revise a value for one of the setup options for a job, the apparatus moves and keeps the original value for the revised setup option into a storage unit of the apparatus. When the value for the setup option has been revised, the apparatus stores the revised value into the storage unit of the apparatus. The apparatus then checks the values in the storage unit to classify the setup options for the job into definite setup options and indefinite setup options. For example, if a value for a certain setup option has not been revised, if the original value and the revised value for a certain setup option has been specified by the same operator (or by operators in the same department of the office), or if the input date of the revised value is after a predetermined date, the certain setup option is classified as a definite setup option. On the other hand, if a value for a certain setup option has been revised, the original value and the revised value for the certain setup option has been specified by different operators (or by operators in different departments of the office), and the input date of the revised value is before the predetermined date, the certain setup option is classified as an indefinite setup option. The apparatus then registers into the database the definite setup options and values for the definite setup options, and the indefinite setup options and the original values for the indefinite setup options so that the indefinite setup options are marked off from the definite setup options, by using, for example, flags for these kinds of setup options. FIG. 14 illustrates an example of a record of the database, created by these operations. In this example, a set of "Paper Size" option and the value "A4" is registered with being marked as indefinite and the other setup options and their values that are not revised (in this example, a set of "Print Method" option and "DEP", a set of "Product Size" option and "A4", and a set of "Binding Style" option and "Saddle Stitch") are registered with being marked as definite.

Built-in controller 21 (display controller 21a) of information input apparatus 20 receives an operator's input of a value for one of setup options for a job (a target setup option) shown in a print setup screen (Step S101). For example, built-in controller 21 (display controller 21a) causes display unit 27 to display print setup screen 60 as illustrated in FIG. 6, and receives an operator's input of a value for one of the setup options shown in print setup screen 60, for which the operator wants to specify a value (a target setup option). In this step, it is assumed that, for each of at least one of the other setup options in print setup screen 60, a value had already been specified by an operator's input or by default.

Next, from the rule collection stored in storage unit 25 or another storage device, built-in controller 21 (candidate searcher 21b) chooses a rule using the value input for the target setup option and a value or values each already specified for another of the setup options by an operator's input or by default (Step S102). Built-in controller 21 (candidate searcher 21b) then uses the chosen rule to search for a candidate value for an unspecified setup option, for which no value is specified by an operator's input, among the setup options for the job (Step S103). In this step, built-in controller 21 (candidate searcher 21b) obtains at least one evaluation value for the chosen rule, from built-in controller 21 (rule manager 21c), as needed.

Next, built-in controller 21 (candidate searcher 21b) judges whether a candidate value has been found for the unspecified setup option (Step S104). On judging that a candidate value for the unspecified setup option has been found (YES in Step S104), built-in controller 21 (display controller 21a) causes display unit 27 to display the candidate value for the unspecified setup option in print setup screen 60 so as to indicate the candidate value in the input field for the unspecified setup option (Step S105). In this step, as needed, built-in controller 21 (display controller 21a) causes display unit 27 to display an evaluation value calculated for the rule used for the process of searching for the candidate value, together with the candidate value in print setup screen 60, or to change the appearance of the candidate value (for example, emphasize the candidate value) shown in print setup screen 60, according to the evaluation value.

On failing to find a candidate value for the unspecified setup option (for example, judging that no candidate value has been found for the unspecified setup option) (NO in Step S104), built-in controller 21 (candidate searcher 21b) judges whether the target setup option is an indefinite setup option (Step S106). For example, built-in controller 21 (candidate searcher 21b) checks records of the database stored in storage device 30 or the rule collection stored in storage unit 20 or another storage device, and judges the target setup option. If the target setup option is a specific type of setup option, for which different values are specified together with the same set of values for two or more of the other setup options in the records of the database or the rule collection (in the case of checking the rule collection, the same set of values include a value or values specified for at least one specified setup option and a candidate value for an unspecified setup option), built-in controller 21 (candidate searcher 21b) judges the target setup option is an indefinite setup option. In the case that setup-information input system 10 uses the database including records of values which had been specified for setup options for past print jobs, in which an indefinite setup option or options are marked off from definite setup options (as disclosed in the above-described Japan Patent Application No. 2018-1017029 invented by the present inventor and filed with the Japan Patent Office), built-in controller 21 (candidate searcher 21b) judges whether the target setup option is an indefinite setup option in accordance with the classification of setup options in the database.

On judging that the target setup option is an indefinite setup option (YES in Step S106), built-in controller 21 (display controller 21a) causes display unit 27 to display a screen that cautions an operator about the target setup option, to call operator's attention to the target setup option, as illustrated in FIG. 13 (Step S107). After that, built-in controller 21 judges whether to continue receiving operator's input operations on print setup screen 60 (Step S108). On judging to continue receiving operator's input operations on print setup screen 60 (YES in Step S108), built-in controller 21 returns to Step S101 to performs the succeeding processes again.

On judging not to continue receiving operator's input operations on print setup screen 60 (NO in Step S108), built-in controller 21 (job generator 21d) generates a job with the values specified for the setup options and outputs the generated job to job processing apparatus 40 (image forming apparatus 40a) to instruct the job processing apparatus 40 (image forming apparatus 40a) to perform job processing (Step S109).

Hereinafter, a detailed description is given of the above-described operations, by using a concrete example.

FIG. 6 is a diagram illustrating an example of print setup screen 60 displayed on display unit 27 of information input apparatus 20. The print setup screen 60 shows various setup options for a job so as to allow an operator to input values for the setup options for the print job on the screen. FIG. 7 illustrates a part of the setup options shown in print setup screen 60, which include the "Print Method", "Product Size", "Paper Size", "Binding Style" and "Delivery Date" options.

FIG. 8 illustrates the condition that several input field for the setup options shown in FIG. 7 are filled with setting values. In this condition, "Saddle Stitch" had been specified for the "Binding Style" option by an operator's input or by default, "A4" had been specified for the "Product Size" option by an operator's input or by default, and "2017 Dec. 31" had been specified for the "Delivery Date" option by an operator's input, in print setup screen 60. In the condition shown in FIG. 8, "Offset" has further been input for the "Print Method" option by an operator on print setup screen 60 additionally to those values.

In response to receiving an operator's input of "Offset" for the "Print Method" option in print setup screen 60 through operation unit 28, built-in controller 21 (candidate searcher 21b) uses values including the value that has been specified for the target setup option (in this case, "Offset" for the "Print Method" option) and the values that had been specified for the specified setup options (in this case, "Saddle Stitch" for the "Binding Style" option and "A4" for the "Product Size" option), and chooses a rule using the values, from the rule collection. Built-in controller 21 (candidate searcher 21b) then uses the chosen rule to search for a candidate value for the unspecified setup option (in this case, the "Paper Size" option).

FIG. 9 illustrate an example of the rules. In this example, Rule 1 gives a suggestion of "A1" as a candidate value for the "Paper Size" option, if "Offset" is specified for the "Print Method" option and "A4" is specified for the "Product Size" option. Rule 2 gives a suggestion of "A1" as a candidate value for the "Paper Size" option, if "Offset" is specified for the "Print Method" option and "A5" is specified for the "Product Size" option. Rule 3 gives a suggestion of "SRA3" as a candidate value for the "Paper Size" option, if "DEP" is specified for the "Print Method" option and "A4" is specified for the "Product Size" option. Rule 4 gives a suggestion of "SRA3" as a candidate value for the "Paper Size" option, if "DEP" is specified for the "Print Method" option and "A5" is specified for "Product Size" option.

In the example of FIG. 8, "Offset" has been input by an operator for the "Print Method" option being the target setup option, in print setup screen 60, under the condition that "A4" had been specified for the "Product Size" option being a specified setup option, in print setup screen 60. Therefore, in response to the operator's input, built-in controller 21 (candidate searcher 21b) chooses Rule 1 in FIG. 9, and obtains "A1" as a candidate value for the "Paper Size" option being an unspecified setup option. Built-in controller 21 (display controller 21a) then causes display unit 27 to display the obtained candidate value in the input field for the "Paper Size" option, which is an unspecified setup option, in print setup screen 60, as illustrated in FIG. 10.

When an operator revises the value for the "Print Method" option to "DEP" on print setup screen 60, as illustrated in FIG. 11, built-in controller 21 (candidate searcher 21b) chooses Rule 3 in FIG. 9, and obtains "SRA3" as a candidate value for the "Paper Size" option being an unspecified setup option. Built-in controller 21 (display controller 21a) then causes display unit 27 to display the obtained candidate value in the input field for the "Paper Size" option, which is an unspecified setup option, in print setup screen 60, as illustrated in FIG. 12. In this process, built-in controller 21 (display controller 21a) may cause display unit 27 to display an evaluation value (in this case, "Support Value: 0.8") calculated for the rule used for searching for the candidate value, together with the candidate value, as illustrated in FIG. 15. Alternatively, built-in controller 21 (display controller 21a) may change the appearance of the candidate value displayed in print setup screen 60, according to the evaluation value calculated for the rule used for searching for the candidate value, by indicating the candidate value in boldface, indicating the candidate value by colored text or coloring the inside of the frame of the input field for the candidate value in print setup screen 60, in accordance with the evaluation value, as illustrated in FIG. 16. In the example of FIG. 16, the candidate value is indicated in boldface.

The above-described operations allow an operator to specify an appropriate value for the "Paper Size" option without considering the association among the paper size, the print method and the product size, which decreases operator's time and efforts necessary for input operations.

The above-described example gave the operations of information input apparatus 20 in the situation that a unique value can be determined for a candidate value for an unspecified setup option, which is likely to be specified together with the value for the target setup option and a value or values for at least one specified setup option. On the other hand, another situation that there are two or more values for the target setup option, together with which the same values for other setup options are specified in the rule collection (or the database), can arise. This situation needs careful configuration of the target setup option.

In view of that, in response to failing to find a candidate value for an unspecified setup option, built-in controller 21 (candidate searcher 21b) checks the rule collection (or the database), to judge whether the target setup option is the specific type of setup option for which different values are specified together with the same set of values for two or more of the other setup options. When failing to find a candidate value for an unspecified setup option and judging that the target setup option is the specific type of the setup option, built-in controller 21 (display controller 21a) causes display unit 27 to display caution dialog box 61 as illustrated in FIG. 13 so as to give caution about the target setup option to an operator.

The above-described operations of input information apparatus 20 allow an operator to learn a suitable combination of setting values, which improves operator's skills to configure setup options for a job.

It should be noted that the present invention should not be limited to the above-described embodiments, and the constitution and control operations of the setup-information input system can be modified suitably, unless the modification deviates from the intention of the present invention.

For example, the above-described embodiments used the "Print Method" option as an example of the target setup option, the "Product Size" option as an example of a specified setup option, and the "Paper Size" option as an unspecified setup option. However, the target setup option, the specified setup option and the unspecified setup option should not be limited to those, and arbitrary options can be employed for them appropriately.

Though the above-described embodiments gave operations to be performed when an operator specifies print setup information, the described operations can be applied similarly to other operations to be performed when an operator specifies arbitrary information for multiple setup options for a job.

The present invention is applicable to input assistance programs, non-transitory computer-readable recording media each storing the input assistance program, and input assisting methods, which can assist operator's operations to configure setup options for a print job on a setup screen.

Although embodiments of the present invention have been described and illustrated in detail, it is clearly understood that the same is by way of illustration and example only and not limitation, the scope of the present invention should be interpreted by terms of the appended claims.

The invention claimed is:

1. A non-transitory computer-readable recording medium storing an input assistance program to be executed in an apparatus for configuring setup options for a print job, the program comprising instructions which, when executed by a hardware processor of the apparatus, cause the hardware processor to perform operations comprising:
   receiving an operator's input of a value for one of setup options for a print job through an input device of the apparatus;
   searching for a candidate value for an unspecified setup option, for which no value is specified by an operator's input, among the setup options for the print job, by using a rule chosen from a rule collection prepared in advance, on a basis of the value input for the one of the setup options and a value or values each already specified for another of the setup options by an operator's input or by default; and
   in response to finding the candidate value, causing a display of the apparatus to display the candidate value for the unspecified setup option.

2. The non-transitory computer-readable recording medium of claim 1,
   wherein the causing the display to display the candidate value includes
   using an evaluation value calculated for each rule in the rule collection, and
   performing at least one of
      causing the display to display the evaluation value calculated for the rule used in searching for the candidate value, together with the candidate value or
      changing an appearance of the candidate value displayed on the display, according to the evaluation value calculated for the rule used in searching for the candidate value.

3. The non-transitory computer-readable recording medium of claim 2,
   wherein the evaluation value is one of support, confidence and lift used in association analysis.

4. The non-transitory computer-readable recording medium of claim 1,
   wherein the operations further comprise creating the rule collection by using machine learning on a basis of a database including records of values which had been specified for setup options for past print jobs, the database being stored in a storage device which is communicatively connected to the hardware processor of the apparatus.

5. The non-transitory computer-readable recording medium of claim 4,
   wherein in the records of the database, a specific type of setup option, for which different values are specified together with a same set of values for two or more of the other setup options, is marked off from the other setup options,
   the searching for the candidate value includes checking the database to judge whether the one of the setup options is the specific type of setup option, and
   the causing the display to display the candidate value includes, in response to failing to find a candidate value for the unspecified setup option and judging that the one of the setup options is the specific type of setup option, causing the display of the apparatus to output information that gives caution about the one of the setup options.

6. The non-transitory computer-readable recording medium of claim 4,
   wherein the searching for the candidate value includes checking the rule collection to judge whether the one of the setup options is a specific type of setup option, for which different values are specified together with a same set of values for two or more of the other setup options, and
   the causing the display to display the candidate value includes, in response to failing to find a candidate value for the unspecified setup option and judging that the one of the setup options is the specific type of setup option, causing the display of the apparatus to output information that gives caution about the one of the setup options.

7. An input assisting method for use in an apparatus for configuring setup options for a print job, the method comprising:
   receiving, by a hardware processor of the apparatus, an operator's input of a value for one of setup options for a print job through an input device of the apparatus;
   searching, by the hardware processor, for a candidate value for an unspecified setup option, for which no value is specified by an operator's input, among the setup options for the print job, by using a rule chosen from a rule collection prepared in advance, on a basis of the value input for the one of the setup options and a value or values each already specified for another of the setup options by an operator's input or by default; and
   in response to finding the candidate value, causing, by the hardware processor, a display of the apparatus to display the candidate value for the unspecified setup option.

8. The method of claim 7,
   wherein the causing the display to display the candidate value includes
   using an evaluation value calculated for each rule in the rule collection, and
   performing at least one of
      causing the display to display the evaluation value calculated for the rule used in searching for the candidate value, together with the candidate value or
      changing an appearance of the candidate value displayed on the display, according to the evaluation value calculated for the rule used in searching for the candidate value.

9. The method of claim 8,
   wherein the evaluation value is one of support, confidence and lift used in association analysis.

10. The method of claim 7, further comprising creating, by the hardware processor, the rule collection by using machine learning on a basis of a database including records of values which had been specified for setup options for past print jobs, the database being stored in a storage device which is communicatively connected to the hardware processor of the apparatus.

11. The method of claim 10,
wherein in the records of the database, a specific type of setup option, for which different values are specified together with a same set of values for two or more of the other setup options, is marked off from the other setup options,
the searching for the candidate value includes checking the database to judge whether the one of the setup options is the specific type of setup option, and
the causing the display to display the candidate value includes, in response to failing to find a candidate value for the unspecified setup option and judging that the one of the setup options is the specific type of setup option, causing the display of the apparatus to output information that gives caution about the one of the setup options.

12. The method of claim 10,
wherein the searching for the candidate value includes checking the rule collection to judge whether the one of the setup options is a specific type of setup option, for which different values are specified together with a same set of values for two or more of the other setup options, and
the causing the display to display the candidate value includes, in response to failing to find a candidate value for the unspecified setup option and judging that the one of the setup options is the specific type of setup option, causing the display of the apparatus to output information that gives caution about the one of the setup options.

\* \* \* \* \*